(12) United States Patent
Yonezawa

(10) Patent No.: US 12,117,610 B2
(45) Date of Patent: Oct. 15, 2024

(54) IMAGE DISPLAY APPARATUS

(71) Applicant: SONY GROUP CORPORATION, Tokyo (JP)

(72) Inventor: Takeshi Yonezawa, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 604 days.

(21) Appl. No.: 17/432,780

(22) PCT Filed: Mar. 10, 2020

(86) PCT No.: PCT/JP2020/010289
§ 371 (c)(1),
(2) Date: Aug. 20, 2021

(87) PCT Pub. No.: WO2020/189411
PCT Pub. Date: Sep. 24, 2020

(65) Prior Publication Data
US 2022/0003990 A1 Jan. 6, 2022

(30) Foreign Application Priority Data
Mar. 20, 2019 (JP) ................ 2019-052525

(51) Int. Cl.
G02B 26/08 (2006.01)
G02B 5/00 (2006.01)
G02B 5/32 (2006.01)
G02B 27/00 (2006.01)
G02B 27/30 (2006.01)

(52) U.S. Cl.
CPC ......... *G02B 27/0081* (2013.01); *G02B 5/005* (2013.01); *G02B 5/32* (2013.01); *G02B 26/0833* (2013.01); *G02B 27/30* (2013.01)

(58) Field of Classification Search
CPC ...... G02B 27/0081; G02B 5/005; G02B 5/32; G02B 26/0833; G02B 27/30; G02B 2027/0174; G02B 2027/0125; G02B 27/0172; H04N 5/64; H04N 13/344
See application file for complete search history.

(56) References Cited

U.S. PATENT DOCUMENTS

2015/0181103 A1* 6/2015 Kimura ................ H04N 25/61
348/360
2018/0366045 A1 12/2018 Perreault

FOREIGN PATENT DOCUMENTS

| CN | 108351517 A | 7/2018 |
| JP | H06-043391 A | 2/1994 |
| JP | H06-319092 A | 11/1994 |
| JP | 2016-018113 A | 2/2016 |
| WO | WO 2018/165119 A1 | 9/2018 |

* cited by examiner

Primary Examiner — Euncha P Cherry
(74) Attorney, Agent, or Firm — Paratus Law Group, PLLC

(57) ABSTRACT

An image display apparatus of the present technology includes a first lens unit (70), a second lens unit (80), and a microlens array (50). The second lens unit (80) eccentrically faces the first lens unit (70). The microlens array (50) is disposed at a first conjugate position (K1) based on the first and second lens units (70, 80).

17 Claims, 11 Drawing Sheets

IMAGE DISPLAY APPARATUS

CROSS REFERENCE TO PRIOR APPLICATION

This application is a National Stage Patent Application of PCT International Patent Application No. PCT/JP2020/010289 (filed on Mar. 10, 2020) under 35 U.S.C. § 371, which claims priority to Japanese Patent Application No. 2019-052525 (filed on Mar. 20, 2019), which are all hereby incorporated by reference in their entirety.

TECHNICAL FIELD

The present technology relates to an image display apparatus.

BACKGROUND ART

In recent years, a technique of applying an optical system capable of enlarging the angle of view of an image has been proposed for a head part fitting type display such as a head-mounted display. For example, Patent Literature 1 discloses an optical system in which a diffusion optical element whose incident surface or emission surface serves as a diffusion surface is disposed between a transmissive display element and an eyepiece optical system, and the diffusion surface of the diffusion optical element has a shape along the field curvature of the eyepiece optical system.

In the above optical system, the image on the transmissive display element is converted into a display image for compensating the field curvature of the eyepiece optical system by the diffusion optical element. Thus, even if the eyepiece optical system for enlarging and observing the display image has the field curvature, an image of high resolution without blurring over the entire angle of view can be observed.

CITATION LIST

Patent Literature

Patent Literature 1: Japanese Patent Application Laid-open No. Hei 06-319092

DISCLOSURE OF INVENTION

Technical Problem

As described above, there is a need for a technique of presenting an enlarged image to a user in a head part fitting type display such as a head mounted display.

In view of the circumstances described above, the present technology provides, for example, an image display apparatus capable of presenting an enlarged image to a user.

Solution to Problem

In order to solve the above problem, an image display apparatus according to an embodiment of the present technology includes a first lens unit, a second lens unit, and a microlens array.

The second lens unit eccentrically faces the first lens unit.

The microlens array is disposed at a first conjugate position based on the first lens unit and the second lens unit.

An eye of a user may be placed at a second conjugate position different from the first conjugate position based on the first lens unit and the second lens unit.

The image display apparatus may further include a light emitting unit that emits light toward the microlens array, and the light emitting unit may control light that enters the microlens array.

The light emitting unit may control the light that enters the microlens array by changing an emission position or emission direction of the light.

The light emitting unit may be a spatial light modulator or a microdisplay and may change the emission position of the light that enters the microlens array.

The light emitting unit may be a MEMS array and may change the emission direction of the light that enters the microlens array.

The light emitting unit may control the light that enters the microlens array to be refracted by the microlens array and to be parallel light.

The second lens unit may convert light refracted by the first lens unit into divergent light.

The light emitting unit may control the light that enters the microlens array to be refracted by the microlens array and to be convergent light.

The second lens unit may convert light refracted by the first lens unit into substantially parallel light.

The image display apparatus may further include a diaphragm that is disposed between the microlens array and the light emitting unit and restricts the light that enters the microlens array.

The diaphragm may include an aperture and restrict the light that enters the microlens array on the basis of an arrangement of the aperture.

The first lens unit may be a transmissive or reflective hologram lens, and the second lens unit may be a reflective hologram lens.

The microlens array may include a plurality of lenses, and the light emitting unit may include a plurality of regions corresponding to the plurality of lenses and vary output amounts of light for each of the regions.

The second lens unit may be disposed at a position farther from the eye of the user than the first lens unit.

Each of the first lens unit and the second lens unit may have a central axis, and the central axis of the first lens unit may be disposed at a position farther from the eye of the user than the central axis of the second lens unit.

The first lens unit may be a transmissive or reflective eccentric lens, and the second lens unit may be a reflective eccentric lens.

MODE(S) FOR CARRYING OUT THE INVENTION

Hereinafter, embodiments of the present technology will be described with reference to the drawings.

First Embodiment

[Configuration of Image Display Apparatus]

Figure 1:
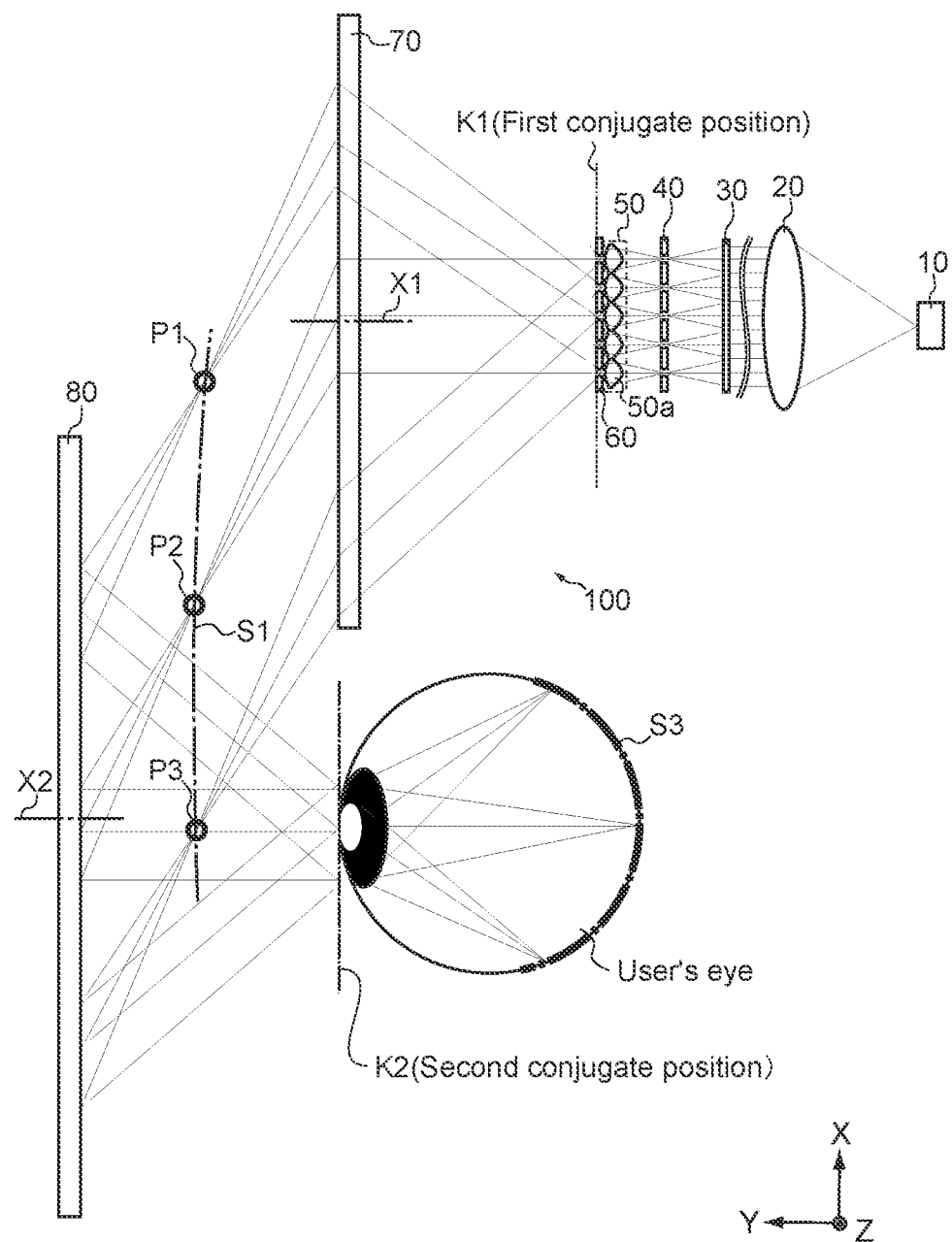
FIG. 1 is a schematic diagram showing in a simplified manner a configuration example of an optical system of an image display apparatus according to a first embodiment of the present technology.

FIG. 1 is a schematic diagram showing in a simplified manner a configuration example of an optical system of an image display apparatus according to an embodiment of the present technology, and is a diagram showing a light ray tracing result in the optical system. As shown in FIG. 1, an image display apparatus 100 includes a light source 10, a condenser lens 20, a spatial light modulator (SLM) 30, a first diaphragm 40, a microlens array 50, a second diaphragm 60, a first lens unit 70, and a second lens unit 80. Note that X, Y and Z axes illustrated in FIG. 1 respectively represent directions of three axes orthogonal to each other. The same applies to subsequent figures.

The light source 10 is typically a coherent light source such as a laser, but is not limited thereto. The light source 10 may be a point light source or a collimated light source. Light of the light source 10 is emitted toward the condenser lens 20.

The condenser lens 20 is a lens used to collect light emitted by the light source 10. Light collected by the condenser lens 20 is emitted toward the SLM 30. The condenser lens 20 may be a single lens or lenses in combination. The condenser lens 20 is arranged on a light entrance side of the SLM 30 to face the light source 10.

The SLM 30 is a device that modulates light from the light source 10 by electrically controlling a spatial distribution of the light (for example, amplitude, phase, and polarization). The light modulated and emitted by the SLM 30 enters the microlens array 50. The SLM 30 is an example of "light emitting unit" in the claims.

The SLM 30 diffracts light emitted from the condenser lens 20. The diffracted light thus generated is emitted toward the microlens array 50. The SLM 30 of this embodiment is typically a transmissive spatial light modulator, but is not limited thereto. The SLM 30 may be, for example, a reflective spatial light modulator.

The first diaphragm 40 is a shield for adjusting the light amount of the diffracted light diffracted by the SLM 30 and is provided between the SLM 30 and the microlens array 50. The first diaphragm 40 has apertures H1, H2, and H3 that allow the passage of the diffracted light from the SLM 30 (see FIG. 2). The apertures H1, H2, and H3 are provided in the first diaphragm 40 at predetermined intervals separate from each other.

The first diaphragm 40 restricts the light that enters the microlens array 50 in the diffracted light diffracted by the SLM 30. This suppresses disturbance of a reproduced image (hologram image) reproduced by the SLM 30.

The microlens array 50 is provided between the first diaphragm 40 and the second diaphragm 60 and is disposed at a conjugate position K1 based on the first lens unit 70 and the second lens unit 80 (position at which the diffracted light diffracted by the SLM 30 is emitted toward the first lens unit 70). The conjugate position K1 is an example of a "first conjugate position" in the claims. The microlens array 50 includes a plurality of convex lenses 50a disposed along a uniaxial direction. Note that the above-mentioned word "conjugate" means that the relationship between two having an arbitrary relationship does not change even if both of them are interchanged, and the "conjugate position" means the positions thereof. This meaning also applies to the following description.

The convex lens 50a has a curved surface of a predetermined radius of curvature on the first lens unit 70 side and has a curved surface of a smaller radius of curvature than the above radius of curvature on the light source 10 side.

The convex lens 50a is typically a biconvex lens, but is not limited thereto. The convex lens 50a may be, for example, a plano-convex lens or a convex meniscus lens. The convex lens 50a may be made of, for example, glass, plastic, quartz, or fluorite, but is not limited to these materials.

The number of convex lenses 50a is not particularly limited. However, if the number of lenses is too small, this will result in a small number of light rays and in poor visibility of a reproduced image. If the number of lenses is too large, this will result in a local minimum radius of curvature of the convex lens 50a and may cause deterioration of a reproduced image due to design errors during lens manufacturing. Thus, for example, the number of convex lenses 50a is favorably not less than 5 and not greater than 50. In this case, the number of rows of the convex lenses 50a arranged in the Z-axis direction orthogonal to a direction in which the convex lenses 50a are arranged is favorably not less than 5 and not greater than 50. The convex lens 50a has a function of refracting the diffracted light diffracted by the interference fringes displayed on the SLM 30 and of guiding the light to the first lens unit 70.

The second diaphragm 60 is a shield for adjusting the light amount of the diffracted light refracted by the microlens array 50 and is disposed between the first lens unit 70 and the microlens array 50. The second diaphragm 60 is disposed at a position near the surface of the microlens array 50 (convex lenses 50a) on the first lens unit 70 side.

The second diaphragm 60 has apertures that allow the passage of the refracted light from the microlens array 50. The plurality of apertures is provided in the second diaphragm 60 at predetermined intervals in a direction in which the plurality of convex lenses 50a is arranged. Note that the second diaphragm 60 may be omitted as necessary.

The first lens unit 70 is a lens for converging the diffracted light refracted by the microlens array 50. The first lens unit 70 has a central axis X1. The central axis X1 is the axis of the first lens unit 70 that passes through the center of the first lens unit 70 in the longitudinal direction.

The first lens unit 70 is disposed so as to eccentrically face the second lens unit 80 on the light entrance side relative to the second lens unit 80. The "eccentrically" means that the central axis X1 of the first lens unit 70 and the central axis X2 of the second lens unit 80, which will be described later, are not coaxially positioned.

Here, in this embodiment, the central axis X1 and the light source 10 are disposed at positions farther from the user's eye than the central axis X2 of the second lens unit 80. Here, the first diaphragm 40, the microlens array 50, and the second diaphragm 60 may be disposed on the central axis X1.

The first lens unit 70 further refracts the diffracted light refracted by the convex lenses 50a, to image the diffracted light between the first lens unit 70 and the second lens unit 80. As a result, imaging points P1, P2, and P3 are formed on an image plane S1. Here, the image plane S1 is conjugate to a retina S3 of the user.

Here, in this embodiment, the first lens unit 70 and the second lens unit 80 have a point-symmetrical relationship with each other, with the imaging point P2 formed by the first lens unit 70 as the center.

The first lens unit 70 is favorably a transmissive eccentric convex lens. As a result, as shown in FIG. 1, the light source 10 can be disposed on the side on which the eyes of the user are placed, and when the image display apparatus 100 is applied to eyewear such as a head mounted display (hereinafter, referred to as "HMD") or the like, the apparatus configuration of the eyewear can be made compact as compared to the configuration shown in FIG. 6 to be described later.

The first lens unit 70 is typically a transmissive eccentric convex lens, but it is not limited thereto. For example, the first lens unit 70 may be a transmissive or reflective hologram lens or may be a diffractive lens. Note that the "eccentric" described above means a deviation between the central axis X1 of the first lens unit 70 and the imaging point P2.

The first lens unit 70 may be made of, for example, glass, plastic, quartz, or fluorite, but is not limited to these materials.

The first lens unit 70 of this embodiment has, for example, a function of correcting the chromatic dispersion of the diffracted light diffracted by the interference fringes displayed on the SLM 30, and the chromatic dispersion of the diffracted light caused by the second lens unit 80. Thus, the image quality deterioration of the reproduced image (hologram image) to be presented to the user is suppressed.

As shown in FIG. 1, the second lens unit 80 is disposed so as to face the user's eye at a predetermined interval. The second lens unit 80 has the central axis X2. The central axis X2 is the axis of the second lens unit 80 that passes through the center of the second lens unit 80 in the longitudinal direction.

In this embodiment, the second lens unit 80 may be disposed at a position farther from the user's eye than the first lens unit 70. In this case, the user's eye is disposed at the conjugate position K2 different from the conjugate position K1, which is based on the first lens unit 70 and the second lens unit 80 (a position at which the diffracted light reflected by the second lens unit 80 enters the user's eye). The conjugate position K2 is an example of a "second conjugate position" in the claims. The distance between the second lens unit 80 and the user's eye is, for example, 15 mm or more and 50 mm or less.

The second lens unit 80 converts the diffracted light, which is refracted by the first lens unit 70 and imaged at the imaging points P1, P2, and P3, into substantially parallel light. As a result, imaging points P4, P5, and P6 are formed on the retina S3 of the user's eye. The imaging points P4, P5, and P6 and the imaging points P1, P2, and P3 are conjugate to each other, respectively.

The second lens unit 80 is typically a reflective eccentric convex lens, but it is not limited thereto. For example, the second lens unit 80 may be a reflective hologram lens or may be a diffractive lens. Note that the "eccentric" described above means a deviation between the central axis X2 of the second lens unit 80 and the imaging point P2.

The second lens unit 80 may be made of, for example, glass, plastic, quartz, or fluorite, but is not limited to these materials.

The second lens unit 80 of this embodiment has a function of correcting the aberration caused by the fact that the first lens unit 70 is eccentric. Thus, the eccentric aberration by the first lens unit 70 is canceled by the second lens unit 80, so that a magnification optical system of small aberration is achieved.

The configuration example of the optical system of the image display apparatus 100 has been described above in a simplified manner. Each of the constituent elements described above may be configured using a general-purpose member or configured using a member specialized for a function of each constituent element. Such a configuration may be changed as appropriate according to a technical level necessary every time the present technology is practiced.

[Operation of Image Display Apparatus]

Next, the operation of the optical system of the image display apparatus 100 will be described as appropriate with reference to the drawings.

First, light emitted from the light source 10 is collected by the condenser lens 20, and the collected light is emitted onto the SLM 30. The light emitted onto the SLM 30 is diffracted by the interference fringes, part of which is displayed on the SLM 30, and enters the microlens array 50.

At this time, the intensity distribution (intensity ratio) of the light emitted to the light source 10 may be different for each of regions 30a, 30b, and 30c of the SLM 30 corresponding to each of the plurality of convex lenses 50a. Thus, it is possible to equalize the intensity distribution of the diffracted light diffracted in each of the regions 30a, 30b, and 30c and to reduce unevenness in the light amount and a decrease in luminance. Note that, in the following description, the diffracted light diffracted by the SLM 30 will be referred to as light rays r1, r2, and r3 for convenience of description.

Figure 2:
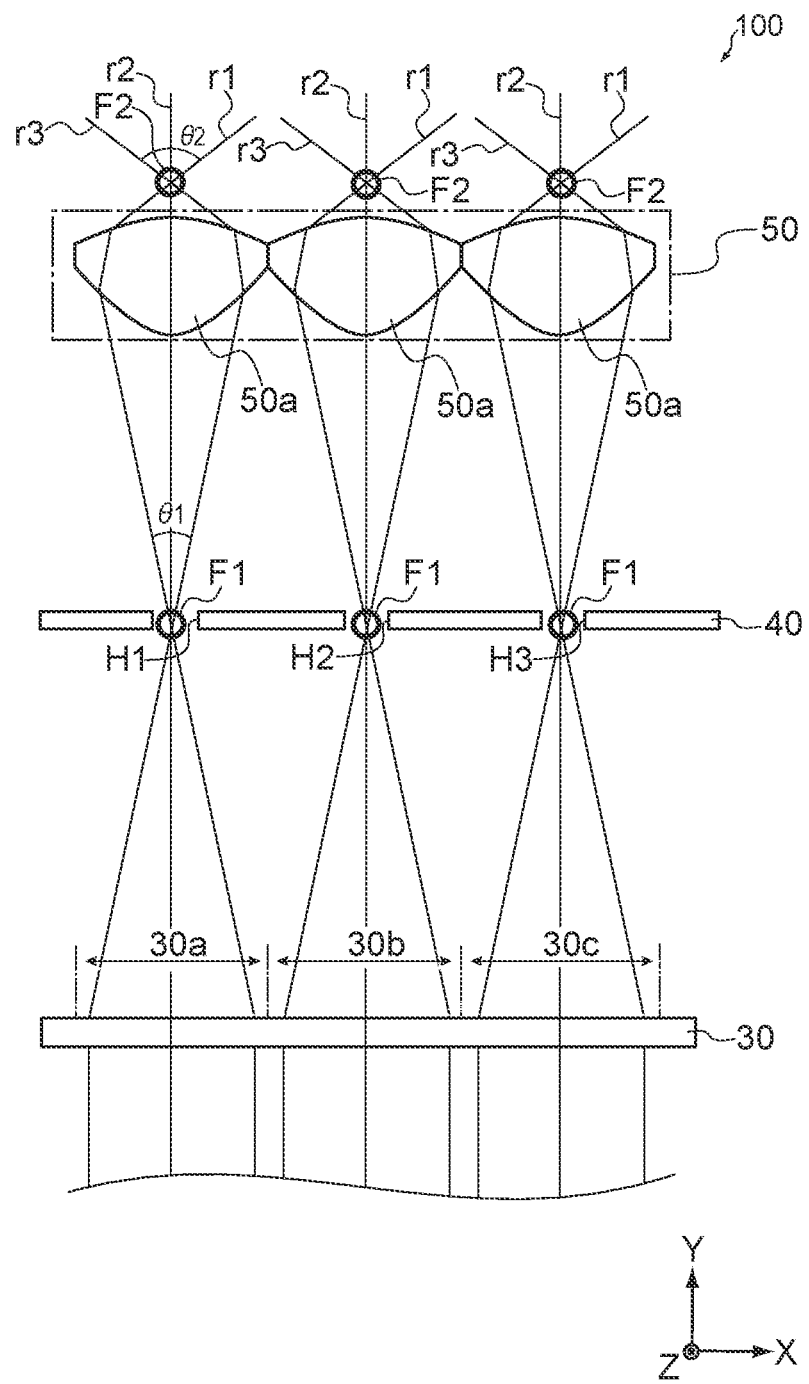
FIG. 2 is a schematic diagram showing a light ray tracing result of the optical system.

The light rays r1, r2, and r3 traveling straight toward the microlens array 50 form focal points F1 by the first diaphragm 40 in the respective apertures H1, H2, and H3 provided in the first diaphragm 40, and further form focal points F2 by passing through the convex lenses 50a (see FIG. 2).

Here, the convex lens 50a has a curved surface of a predetermined radius of curvature on the light source 10 side, and has a curved surface of a larger radius of curvature than the above radius of curvature on the first lens unit 70 side. Thus, an angle θ2 formed by the light rays r1 and r3 refracted by the convex lens 50a is larger than an angle θ1 formed by the light rays r1 and r3 incident on the convex lens 50a.

Thus, the focal length of the focal point F2 (the distance between the convex lens 50a and the focal point F2) is shorter than the focal length of the focal point F1 (the distance between SLM 30 and the focal point F1). Therefore, the light rays r1 and r3 will form an image at a position farther from the SLM 30 as compared with the case where there is no microlens array 50, and the angle of view of the image is significantly larger than that of the image at the focal point F1. That is, an enlarged image in which the angle of view of the image drawn by the SLM 30 is enlarged by the microlens array 50 is presented to the user.

Figure 3:
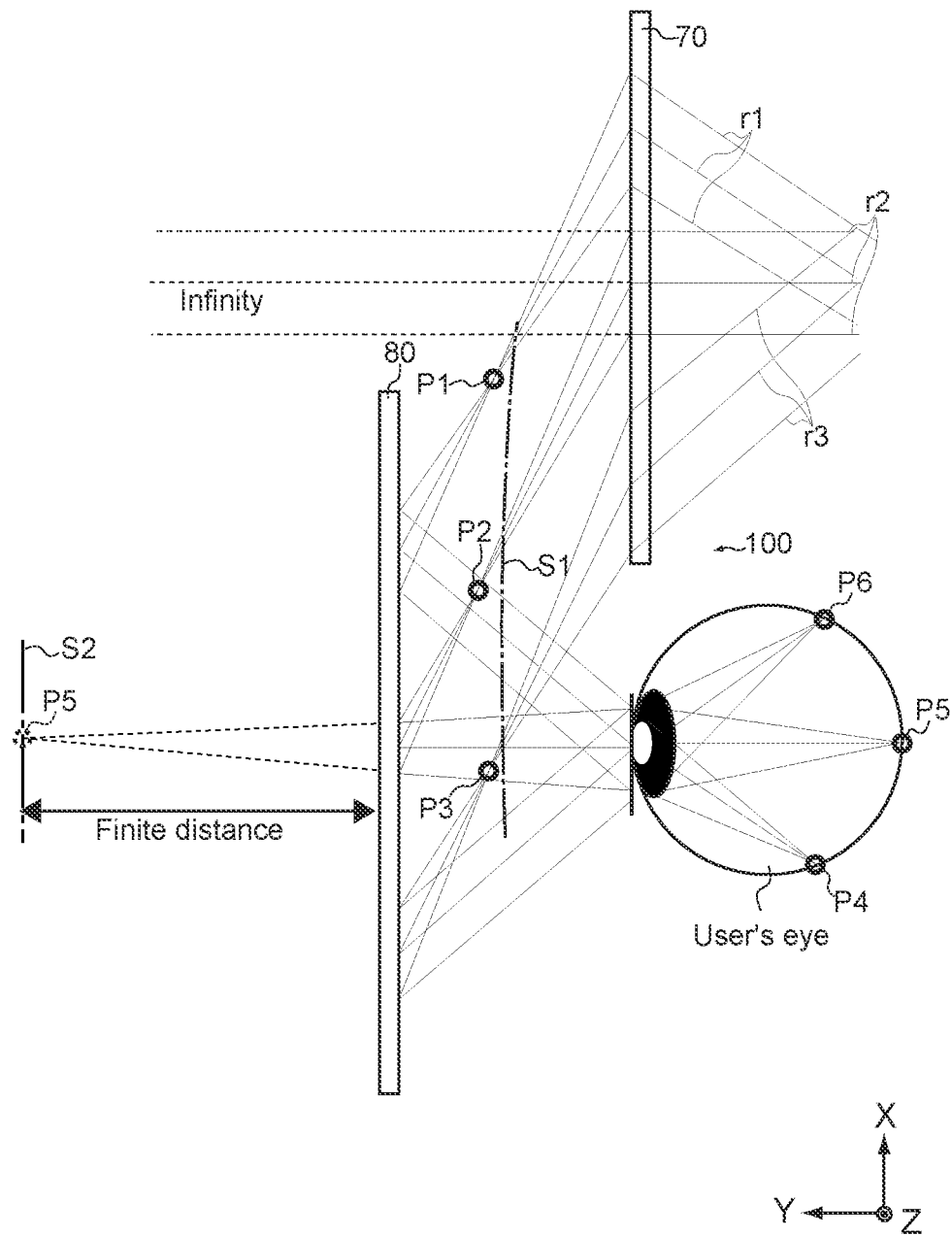
FIG. 3 is a schematic diagram showing a light ray tracing result of the optical system.
Figure 4:
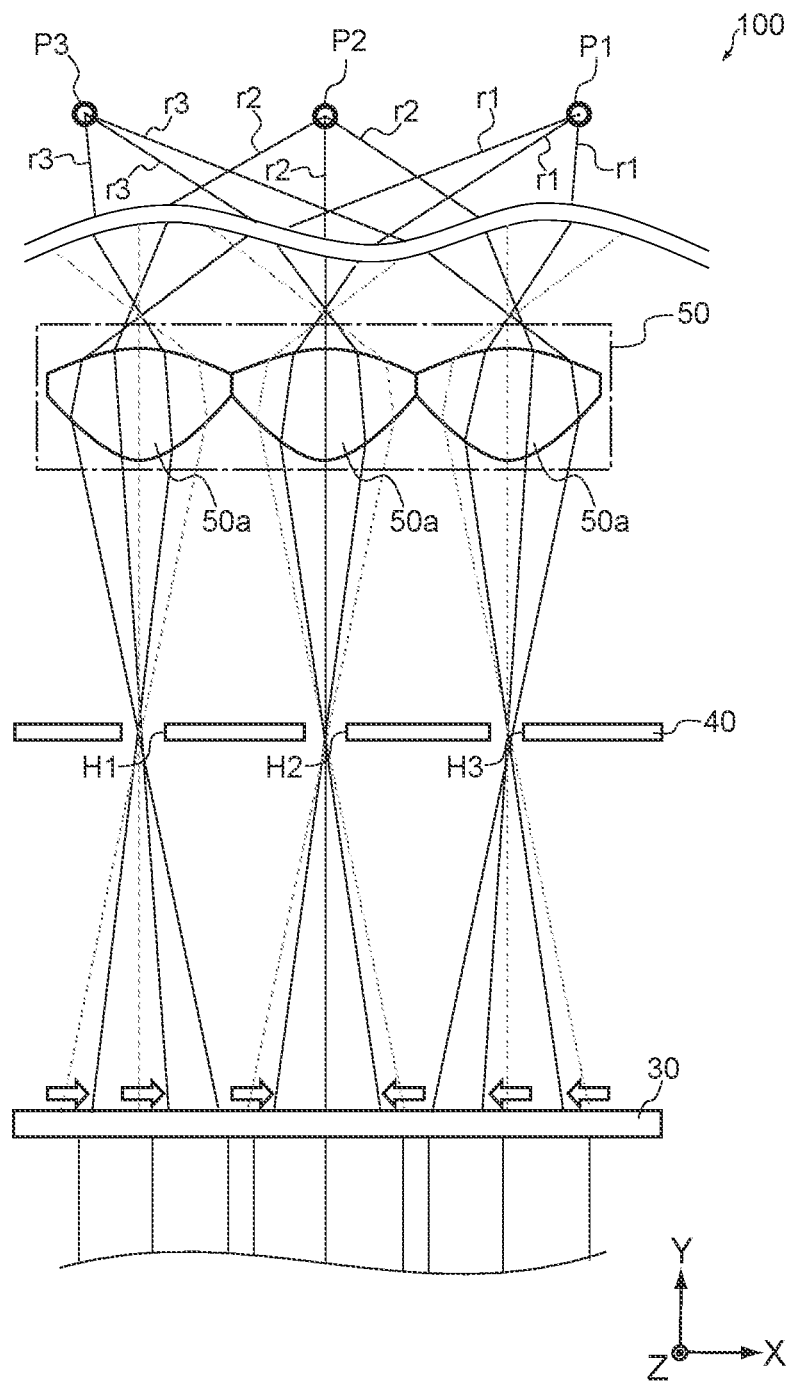
FIG. 4 is a schematic diagram showing a light ray tracing result of the optical system.
Figure 5:
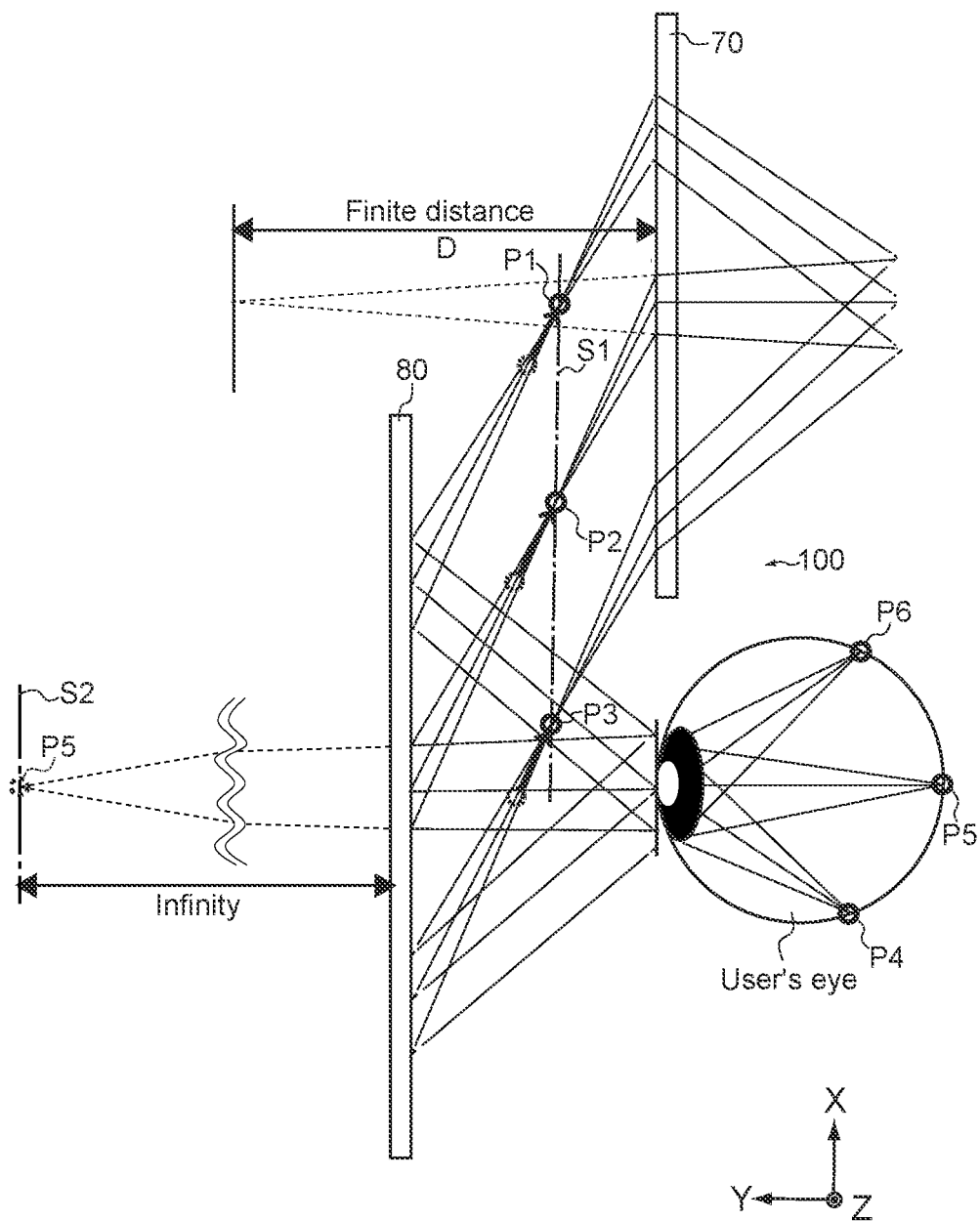
FIG. 5 is a schematic diagram showing a light ray tracing result of the optical system.

FIGS. 2 to 5 are diagrams each showing a light ray tracing result of the optical system of the image display apparatus 100. FIGS. 2 and 4 are schematic diagrams each showing the periphery of the microlens array 50 of the optical system in an enlarged manner. Further, FIGS. 3 and 5 are schematic diagrams each showing a configuration example of the periphery of the first and second lens units 70 and 80 of the optical system.

(Light Ray Control)
Control Example 1

The SLM 30 is configured to be capable of controlling the emission positions of the light rays r1, r2, and r3 such that only the light rays r1, r2, and r3 having predetermined angular components pass through the apertures H1, H2, and H3 of the first diaphragm 40. Here, as shown in FIG. 2, the SLM 30 of this embodiment controls the light rays r1, r2, and r3 such that only the light rays r1 and r3, which will become parallel light after being refracted by the microlens array 50, and the light rays r2, which will pass through the center of the convex lenses 50a while being parallel, pass through the apertures H1, H2, and H3.

Thus, as shown in FIG. 3, the light rays r1 and r3 refracted by the microlens array 50 and the light rays r2 passing through the microlens array 50 are projected at infinity positions by the first lens unit 70. The light rays r1, r2, and r3 projected at the infinity positions with respect to the first lens unit 70 are then refracted by the first lens unit 70 to form an image at a position closer to the second lens unit 80 than to the image plane S1. In the control example 1, the focal length of the first lens unit 70 is set such that the imaging points P1, P2, and P3 are formed at positions closer to the second lens unit 80 than to the image plane S1. Note that the image surface S1 is a virtual surface that forms imaging points at which the light rays r1, r2, and r3 refracted by the first lens unit 70 and converted into substantially parallel light rays by the second lens unit 80 are imaged. The same applies to the following description.

Here, if the SLM 30 controls the light rays r1, r2, and r3 as in the control example 1, the forming positions of the imaging points P1, P2, and P3 are closer to the second lens unit 80 than to the image plane S1, and the light rays r1, r2, and r3 to be reflected on the user's eye by the second lens unit 80 are delivered to the user's eye as divergent light rather than substantially parallel light. As a result, an image plane S2 is virtually formed, on which a virtual image is projected at a position at a finite distance from the user's eye (for example, a position separated from the second lens unit 80 by approximately 1 m).

Control Example 2

Further, as shown in FIG. 4, the SLM 30 of this embodiment is also capable of controlling the light rays r1, r2, and r3 such that only the light rays r1, r2, and r3 that become convergent light after being refracted by the microlens array 50 pass through the apertures H1, H2, and H3.

Specifically, for example, if the configuration around the microlens array 50 in the optical system of the image display apparatus 100 is as shown in FIG. 4, the SLM 30 moves, as shown in the figure, the light ray trajectories of the light rays r2 and r3 passing through the aperture H1 from the left side toward the inside, and moves the light ray trajectories of the light rays r1 and r3 passing through the aperture H2 toward the inside. Further, the SLM 30 moves the light ray trajectories of the light rays r1 and r2 passing through the aperture H3 from the right side toward the inside.

Thus, the light rays r1, r2, and r3 refracted by the microlens array 50 are projected at positions at finite distances by the first lens unit 70. The light rays r1, r2, and r3 projected at the positions at finite distances with respect to the first lens unit 70 are then refracted by the first lens unit 70 and form an image on the image plane S1. In the control example 2, a projection distance in which the light rays r1, r2, and r3 are projected (finite distance D from the first lens unit 70 shown in FIG. 5) is set such that the imaging points P1, P2, and P3 are formed on the image plane S1.

That is, if the SLM 30 controls the light rays r1, r2, and r3 as in the control example 2, the forming positions of the imaging points P1, P2, and P3 are moved from the positions shown in FIG. 3 to the first lens unit 70 side, and the imaging points P1, P2, and P3 coincide with the image plane S1 as shown in FIG. 5. As a result, the light rays r1, r2, and r3 to be reflected on the user's eye by the second lens unit 80 are converted into substantially parallel light by the second lens unit 80 and then delivered to the user's eye. Thus, an image plane S2 is virtually formed, on which a virtual image is projected at an infinity position with respect to the user's eye (for example, a position separated from the second lens unit 80 by approximately 10 m).

From the above description, the SLM 30 of this embodiment is capable of controlling the light rays r1, r2, and r3 to move the forming positions of the imaging points P1, P2, and P3 between the first lens 70 and the second lens unit 80. That is, the SLM 30 is capable of setting any position for a virtual image distance of a virtual image to be presented to the user.

Note that the control examples 1 and 2 have been described assuming that the SLM 30 moves all of the imaging points P1, P2, and P3, but the present technology is not limited thereto. The SLM 30 may vary the forming positions of the imaging points P1, P2, and P3. Thus, for example, the depth of the virtual image projected on the image plane S2 is expressed, and a three-dimensional image of the virtual image can be obtained. This makes it possible to solve the so-called "vergence-accommodation conflict" indicating an imbalance in eye function between vergence and accommodation.

[Modified Example]

In the first embodiment, the diffracted light that enters the microlens array 50 is controlled by the SLM 30, but the present technology is not limited thereto. For example, the diffracted light that enters the microlens array 50 may be restricted on the basis of the diameter of each of the apertures H1, H2, and H3 of the first diaphragm 40 or the arrangement of each of the apertures H1, H2, and H3. In this case, for example, the apertures H1, H2, and H3 formed in the first diaphragm 40 are arranged at positions through which only the light rays r1, r2, and r3 that will become parallel light or convergent light after being refracted by the microlens array 50 pass, so that the virtual image distance of a virtual image to be presented to the user can be set to any position.

Figure 6:
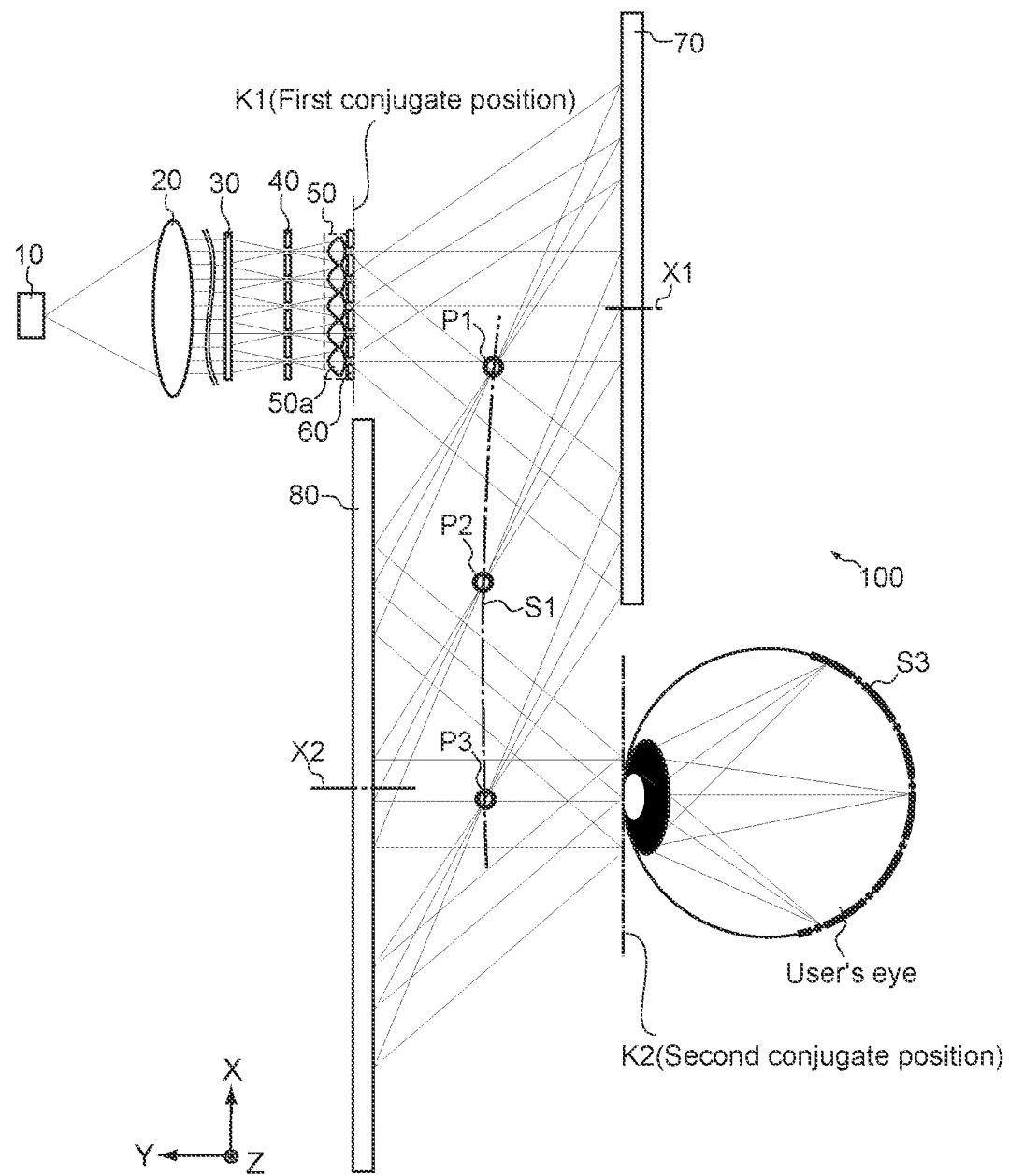
FIG. 6 is a schematic diagram showing in a simplified manner a configuration example of an optical system of an image display apparatus according to a modified example of the first embodiment.

FIG. 6 is a schematic diagram showing in a simplified manner a configuration example of an optical system of an image display apparatus according to a modified example of the first embodiment. In the optical system of the image display apparatus 100, the first lens unit 70 is a transmissive eccentric convex lens, but is not limited thereto. For example, as shown in FIG. 6, the first lens unit 70 may be a reflective eccentric convex lens. Note that, in FIG. 6, the components similar to those in FIG. 1 will be denoted by similar reference symbols, and description thereof will be omitted.

Second Embodiment

Figure 7:
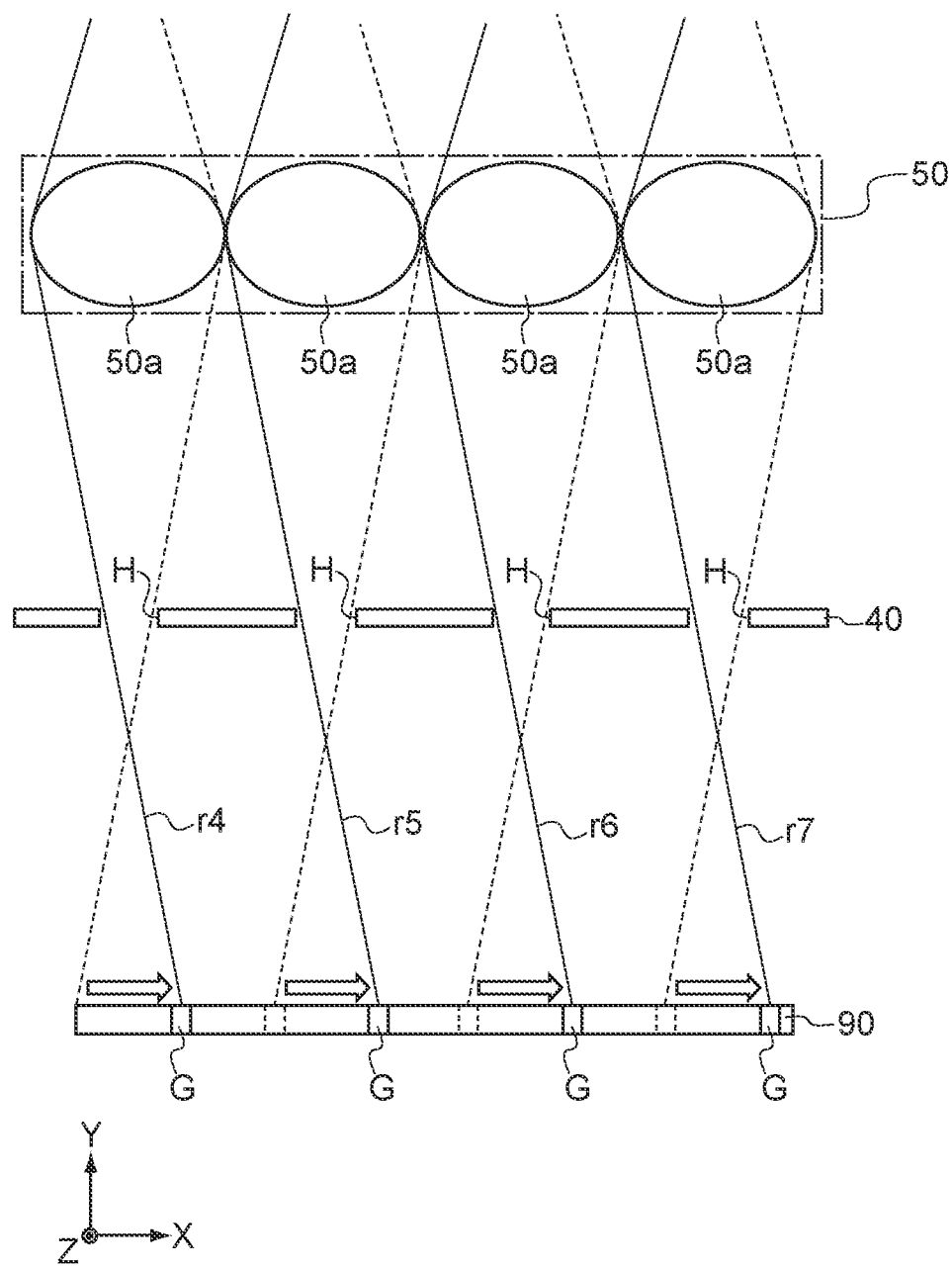
FIG. 7 is a diagram showing a light ray tracing result of an optical system of an image display apparatus according to a second embodiment of the present technology.

FIG. 7 is a diagram showing a light ray tracing result of an optical system of an image display apparatus according to a second embodiment of the present technology and is a diagram showing the periphery of a microlens array 50 of the optical system in an enlarged manner. Hereinafter, the components similar to those in the first embodiment will be omitted from the drawings or will be denoted by similar reference symbols and description thereof will be omitted.
[Configuration of Image Display Apparatus]

The second embodiment of the present technology is different from the first embodiment in that a microdisplay 90 is employed instead of the light source 10 and the SLM 30 of the first embodiment. This configuration provides an optical engine having a light ray width corresponding to the size of the microdisplay 90. The microdisplay 90 is an example of a "light emitting unit" in the claims.

The microdisplay 90 is, for example, an ultra-compact display of less than one inch having a resolution of a predetermined pixel or more. The microdisplay 90 may be a self-luminous microdisplay or may be a transmissive or reflective microdisplay with a light source block. Note that in the following description the light emitted from the microdisplay 90 will be referred to as light rays r4 to r7 for convenience of description.
[Operation of Image Display Apparatus]

As shown in FIG. 7, the microdisplay 90 is configured to be capable of controlling the light ray trajectories of the light rays corresponding to respective pixels G by changing the display positions of the pixels G. Therefore, the microdisplay 90 of this embodiment is capable of controlling the emission positions of the respective light rays r4, r5, r6, and r7 such that only the light rays r4, r5, r6, and r7 that become parallel light or convergent light after being refracted by the microlens array 50 pass through the apertures H.

As a result, each of the light rays r4, r5, r6, and r7 is controlled by the microdisplay 90 in a manner similar to that in the first embodiment described above (paragraphs [0062] to [0068]), so that the microdisplay 90 exhibits operations and effects similar to those in the first embodiment (paragraph [0069]).
[Modified Example]

Figure 8:
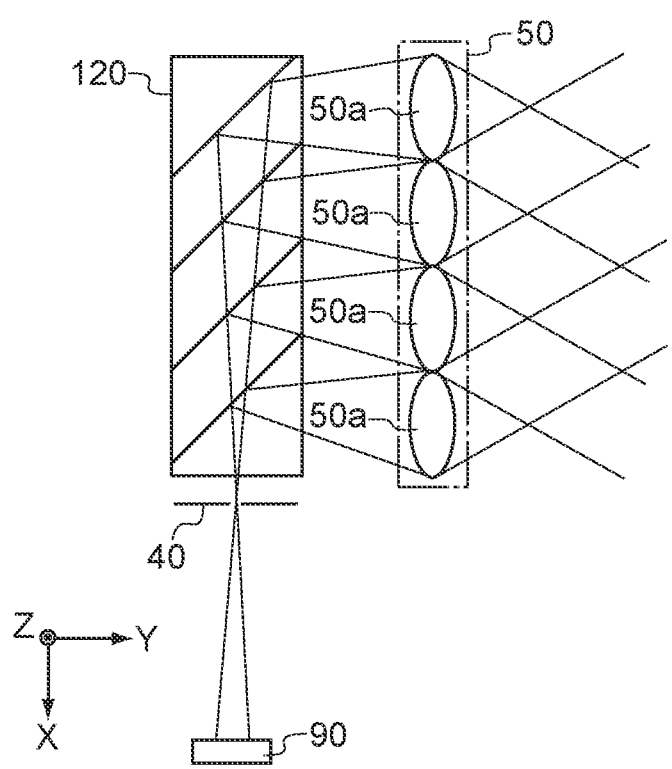
FIG. 8 is a schematic diagram showing in a simplified manner a configuration example of an optical system of an image display apparatus according to a modified example of the second embodiment.
Figure 9:
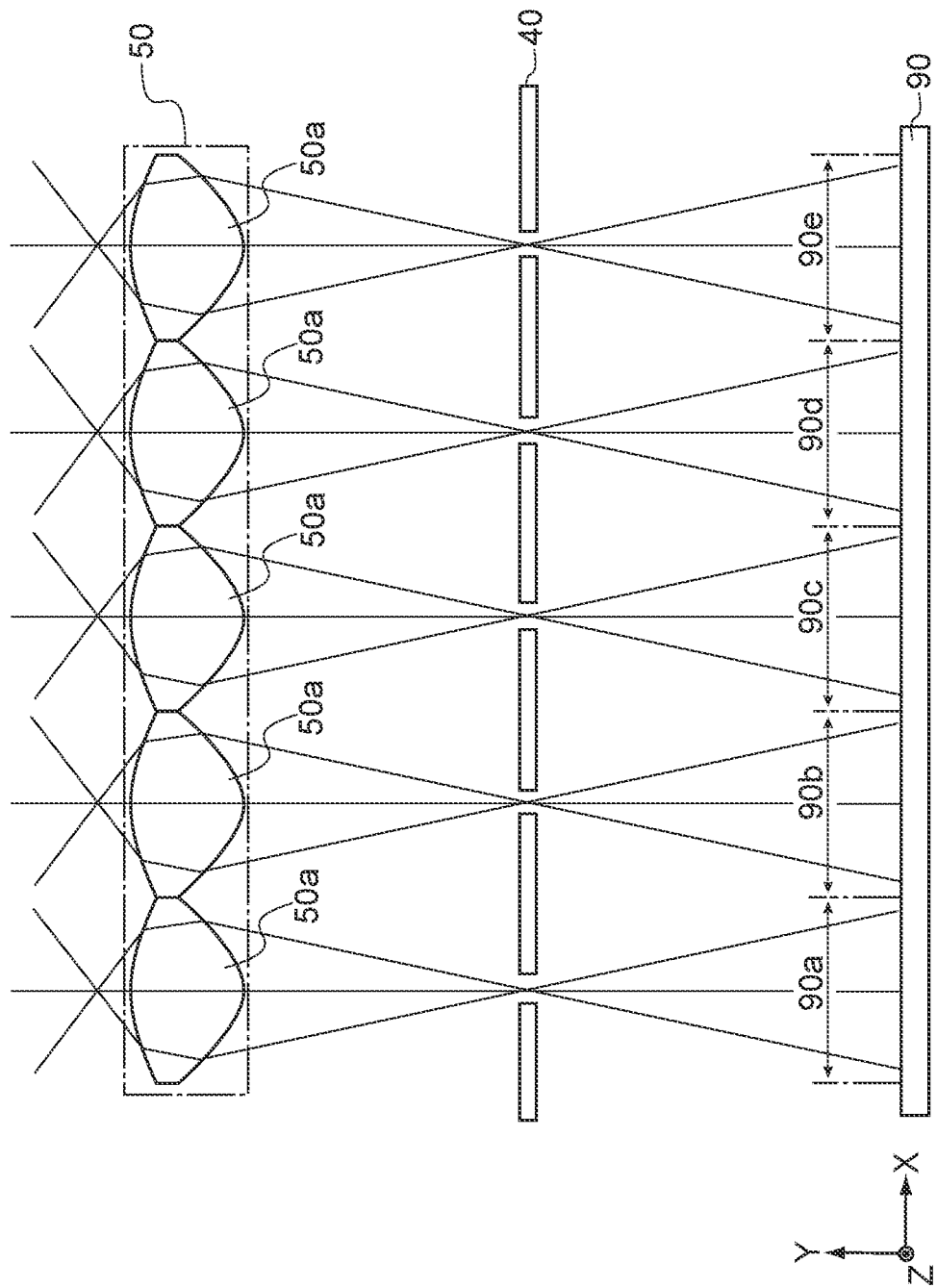
FIG. 9 is a schematic diagram showing in a simplified manner a configuration example of the optical system of the image display apparatus according to the modified example.

FIGS. 8 and 9 are schematic diagrams each showing a configuration example of an optical system of an image display apparatus according to a modified example of the second embodiment in a simplified manner. The optical system of the image display apparatus of the second embodiment may have a configuration including a prism array 120 as shown in FIG. 8. The prism array 120 reflects light emitted from the microdisplay 90 toward the microlens array 50. With this configuration, the luminance unevenness of each convex lens 50a of the microlens array 50 is suppressed.

Further, in the optical system of the image display apparatus of the second embodiment, if the first and second lens units 70 and 80 are hologram lenses, the microdisplay 90 may have different output amounts of light for each of regions 90a, 90b, 90c, 90d, and 90e corresponding to the respective convex lenses 50a.

Thus, for example, if the light emitted from the region 90c is most reflected on the first lens unit 70 or the second lens unit 80 among the regions 90a to 90e, the output amounts of light in the regions 90a, 90b, 90d, and 90e are increased more than in the region 90c, so that the reflection efficiency of the first lens unit 70 or the second lens unit 80 corresponding to the regions 90a, 90b, 90d, and 90e can be supplemented, and the intensity distribution of the light reflected by the first lens unit 70 or the second lens unit 80 can be made uniform.

Third Embodiment

Figure 10:
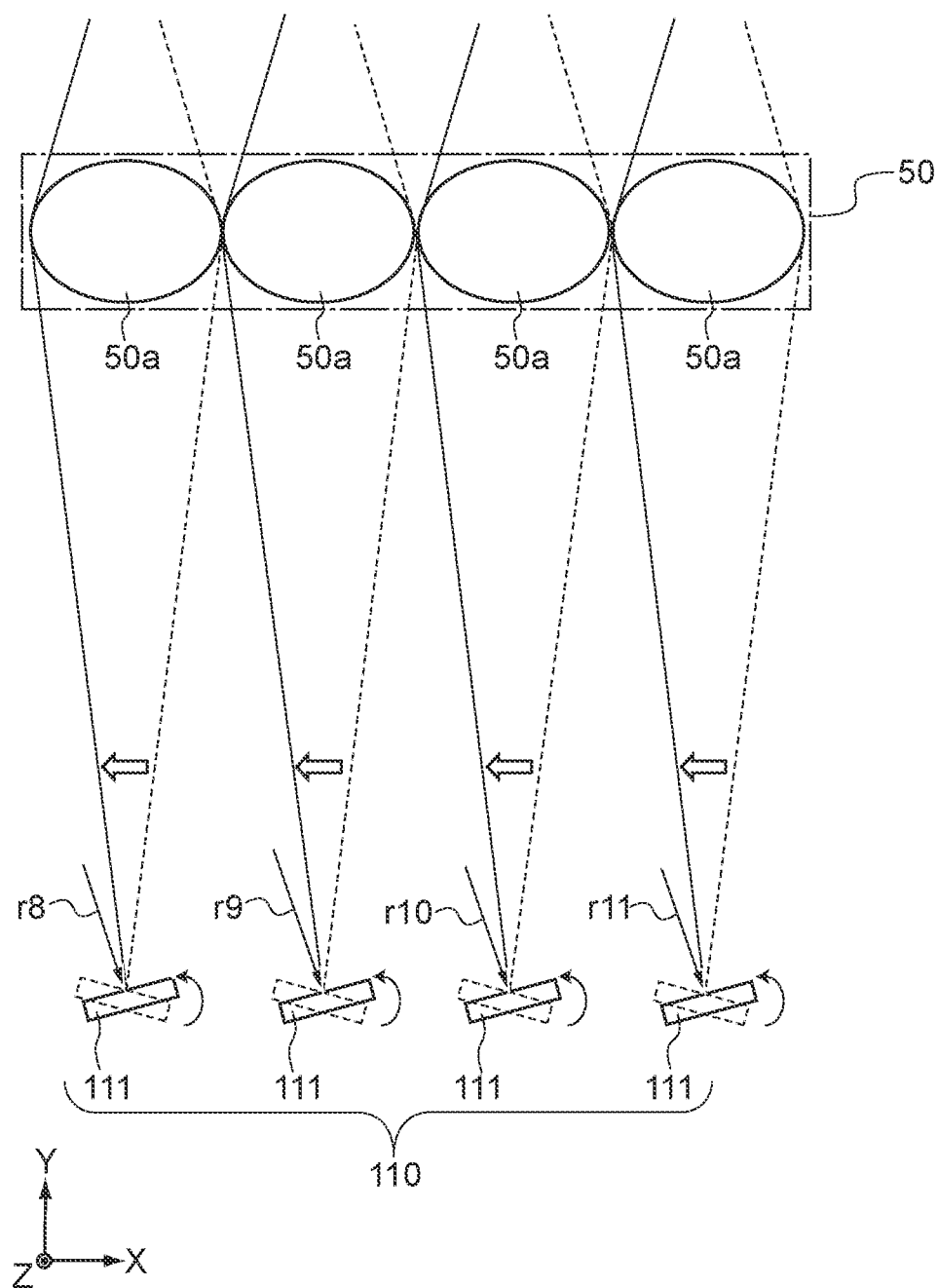
FIG. 10 is a diagram showing a light ray tracing result of an optical system of an image display apparatus according to a third embodiment of the present technology.

FIG. 10 is a diagram showing a light ray tracing result of an optical system of an image display apparatus according to a third embodiment of the present technology and is a diagram showing the periphery of a microlens array 50 of the optical system in an enlarged manner. Hereinafter, the components similar to those in the first embodiment will be omitted from the drawings or will be denoted by similar reference symbols and description thereof will be omitted.
[Configuration of Image Display Apparatus]

The third embodiment of the present technology is different from the first embodiment in that a micro electro mechanical systems (MEMS) array 110 is employed instead of the SLM 30 of the first embodiment. With this configuration, the light utilization efficiency is improved, and an image in which the angle of view is further enlarged by enlarging the scannable range (rotation range) of MEMSs 111 is also obtained. The MEMS array 110 is an example of a "light emitting unit" in the claims.

The MEMS array 110 includes the MEMSs 111 corresponding to the respective convex lenses 50a. The MEMS 111 is, for example, a MEMS mirror in which various sensors, actuators, electronic circuits, or the like are mounted on a silicon substrate, a glass substrate, an organic material, or the like of a semiconductor.

The MEMS array 110 of this embodiment includes a plurality of MEMSs 111 regularly arranged and is configured to be capable of rotating the MEMSs 111 about the Z-axis as shown in FIG. 10. Note that in the following description the light emitted from the light source 10 will be referred to as light rays r8 to r11 for convenience of description.
[Operation of Image Display Apparatus]

As shown in FIG. 10, the MEMS array 110 is configured to be capable of controlling the light ray trajectories of the light rays r8, r9, r10, and r11 corresponding to the respective MEMSs 111 by rotating the MEMSs 111 about the Z-axis. Therefore, the MEMS array 110 of this embodiment is capable of controlling the emission directions of the respective light rays r8, r9, r10, and r11 such that the light rays r8, r9, r10, and r11 become parallel light or convergent light after being refracted by the microlens array 50.

As a result, each of the light rays r8, r9, r10, and r11 is controlled by the MEMS array 110 in a manner similar to that in the first embodiment described above (paragraphs [0062] to [0068]), so that the MEMS array 110 exhibits operations and effects similar to those in the first embodiment (paragraph [0069]).
[Modified Example]

Figure 11:
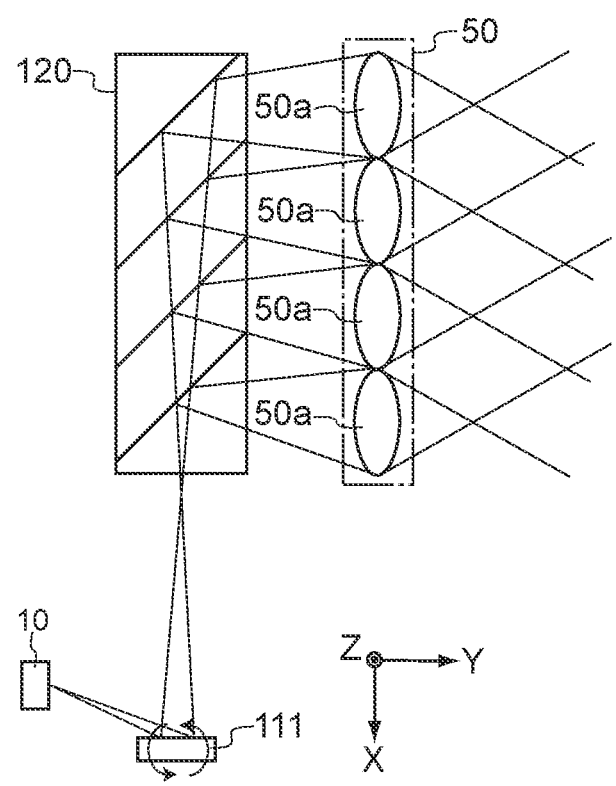
FIG. 11 is a schematic diagram showing in a simplified manner a configuration example of an optical system of an image display apparatus according to a modified example of the third embodiment.

FIG. 11 is a schematic diagram showing a configuration example of an optical system of an image display apparatus according to a modified example of the third embodiment in a simplified manner. As shown in FIG. 11, the optical system of the image display apparatus of the third embodiment may have a configuration including the MEMS 111 and a prism array 120 instead of the SLM 30. The prism array 120 further reflects light from the light source 10 reflected by the MEMS 111 toward the microlens array 50. With this configuration, for example, an effect of enlarging the light ray width can be obtained.

<Supplementary Description>

Although the embodiments of the present technology have been described above, the present technology is not limited to the first to third embodiments described above, and of course various modifications may be made thereto.

Further, the image display apparatus of the present technology is typically applied to eyewear such as an HMD, but the application is not limited thereto. The image display apparatus of the present technology may be applied to various apparatuses capable of displaying an image.

In addition, the effects described herein are not limitative, but are merely descriptive or illustrative. In other words, the present technology may provide other effects apparent to those skilled in the art from the description herein, in addition to, or instead of the effects described above.

The favorable embodiments of the present technology have been described above in detail with reference to the accompanying drawings. However, the present technology is not limited to these examples. It is clear that persons who have common knowledge in the technical field of the present technology could conceive various alternations or modifications within the scope of the technical idea described in the claims. It is understood that of course such alternations or modifications also fall under the technical scope of the present technology.

Note that the present technology may also take the following configurations.

(1) An image display apparatus, including:
a first lens unit;
a second lens unit eccentrically facing the first lens unit; and
a microlens array disposed at a first conjugate position based on the first lens unit and the second lens unit.

(2) The image display apparatus according to (1), in which
an eye of a user is placed at a second conjugate position different from the first conjugate position based on the first lens unit and the second lens unit.

(3) The image display apparatus according to (1) or (2), further including
a light emitting unit that emits light toward the microlens array, in which
the light emitting unit controls light that enters the microlens array.

(4) The image display apparatus according to (3), in which
the light emitting unit controls the light that enters the microlens array by changing an emission position or emission direction of the light.

(5) The image display apparatus according to (3) or (4), in which
the light emitting unit is a spatial light modulator or a microdisplay and changes the emission position of the light that enters the microlens array.

(6) The image display apparatus according to (3) or (4), in which
the light emitting unit is a MEMS array and changes the emission direction of the light that enters the microlens array.

(7) The image display apparatus according to any one of (3) to (6), in which
the light emitting unit controls the light that enters the microlens array to be refracted by the microlens array and to be parallel light.

(8) The image display apparatus according to any one of (3) to (7), in which the second lens unit converts light refracted by the first lens unit into divergent light.

(9) The image display apparatus according to any one of (3) to (8), in which
the light emitting unit controls the light that enters the microlens array to be refracted by the microlens array and to be convergent light.

(10) The image display apparatus according to any one of (3) to (9), in which
the second lens unit converts light refracted by the first lens unit into substantially parallel light.

(11) The image display apparatus according to any one of (3) to (10), further including
a diaphragm that is disposed between the microlens array and the light emitting unit and restricts the light that enters the microlens array.

(12) The image display apparatus according to (11), in which
the diaphragm includes an aperture and restricts the light that enters the microlens array on the basis of an arrangement of the aperture.

(13) The image display apparatus according to any one of (3) to (12), in which
the first lens unit is a transmissive or reflective hologram lens, and
the second lens unit is a reflective hologram lens.

(14) The image display apparatus according to (13), in which
the microlens array includes a plurality of lenses, and
the light emitting unit includes a plurality of regions corresponding to the plurality of lenses and varies output amounts of light for each of the regions.

(15) The image display apparatus according to any one of (2) to (14), in which
the second lens unit is disposed at a position farther from the eye of the user than the first lens unit.

(16) The image display apparatus according to any one of (2) to (15), in which
each of the first lens unit and the second lens unit has a central axis, and
the central axis of the first lens unit is disposed at a position farther from the eye of the user than the central axis of the second lens unit.

(17) The image display apparatus according to any one of (1) to (16), in which
the first lens unit is a transmissive or reflective eccentric lens, and
the second lens unit is a reflective eccentric lens.

REFERENCE SIGNS LIST light source 10
condenser lens 20
SLM (spatial light modulator) 30
first diaphragm 40
microlens array 50
convex lens 50a
second diaphragm 60
first lens unit 70
second lens unit 80
microdisplay 90
image display apparatus 100
MEMS array 110

The invention claimed is:
1. An image display apparatus, comprising:
a first lens unit;
a second lens unit eccentrically facing the first lens unit; and a microlens array disposed at a first conjugate position based on the first lens unit and the second lens unit.

2. The image display apparatus according to claim 1, wherein
an eye of a user is placed at a second conjugate position different from the first conjugate position based on the first lens unit and the second lens unit.

3. The image display apparatus according to claim 2, further comprising
a light emitting unit that emits light toward the microlens array, wherein
the light emitting unit controls light that enters the microlens array.

4. The image display apparatus according to claim 3, wherein
the light emitting unit controls the light that enters the microlens array by changing an emission position or emission direction of the light.

5. The image display apparatus according to claim 4, wherein
the light emitting unit is a spatial light modulator or a microdisplay and changes the emission position of the light that enters the microlens array.

6. The image display apparatus according to claim 4, wherein
the light emitting unit is a MEMS array and changes the emission direction of the light that enters the microlens array.

7. The image display apparatus according to claim 3, wherein
the light emitting unit controls the light that enters the microlens array to be refracted by the microlens array and to be parallel light.

8. The image display apparatus according to claim 7, wherein
the second lens unit converts light refracted by the first lens unit into divergent light.

9. The image display apparatus according to claim 3, wherein
the light emitting unit controls the light that enters the microlens array to be refracted by the microlens array and to be convergent light.

10. The image display apparatus according to claim 9, wherein
the second lens unit converts light refracted by the first lens unit into substantially parallel light.

11. The image display apparatus according to claim 3, further comprising
a diaphragm that is disposed between the microlens array and the light emitting unit and restricts the light that enters the microlens array.

12. The image display apparatus according to claim 11, wherein
the diaphragm includes an aperture and restricts the light that enters the microlens array on a basis of an arrangement of the aperture.

13. The image display apparatus according to claim 3, wherein
the first lens unit is a transmissive or reflective hologram lens, and
the second lens unit is a reflective hologram lens.

14. The image display apparatus according to claim 13, wherein
the microlens array includes a plurality of lenses, and
the light emitting unit includes a plurality of regions corresponding to the plurality of lenses and varies output amounts of light for each of the regions.

15. The image display apparatus according to claim 2, wherein
the second lens unit is disposed at a position farther from the eye of the user than the first lens unit.

16. The image display apparatus according to claim 2, wherein
each of the first lens unit and the second lens unit has a central axis, and
the central axis of the first lens unit is disposed at a position farther from the eye of the user than the central axis of the second lens unit.

17. The image display apparatus according to claim 1, wherein
the first lens unit is a transmissive or reflective eccentric lens, and
the second lens unit is a reflective eccentric lens.

* * * * *